United States Patent [19]

Newberry

[11] 4,378,943
[45] Apr. 5, 1983

[54] TURNTABLE FOR FOLDING GAME BOARDS

[76] Inventor: Meigs W. Newberry, 29 Martin St., Sprinfield, Mass. 01108

[21] Appl. No.: 224,010

[22] Filed: Jan. 12, 1981

[51] Int. Cl.³ .............................................. F16M 11/08
[52] U.S. Cl. ..................................... 273/280; 248/349
[58] Field of Search ........................ 248/349, 185, 186; 273/280, 309; 269/208, 299, 254 R, 289 R

[56] References Cited

U.S. PATENT DOCUMENTS

| | | | |
|---|---|---|---|
| 1,374,139 | 4/1921 | Denniss | 273/280 |
| 2,503,801 | 4/1950 | Clarke | 248/185 X |
| 2,774,599 | 12/1956 | Dunn | 273/280 |
| 2,947,009 | 8/1960 | McKenzie | 272/54 UX |
| 3,113,778 | 12/1963 | Silverman | 273/280 X |
| 3,810,323 | 5/1974 | Lowe | 273/309 |

*Primary Examiner*—Richard C. Pinkham
*Assistant Examiner*—Scott L. Brown
*Attorney, Agent, or Firm*—DeLio & Libert

[57] ABSTRACT

A turn-table for supporting a flat game board, the turn-table including a base portion which rests on a table or the like and a flat platform portion, pivotally supported on the base portion, and provided with a pair of spring clamps, one at each end of the platform, for engaging edge areas of the game board to hold the board securely on the platform. Adjustment of the clamp spacing to fit boards of different sizes can be effected either by relative movement of the parts of a two-piece platform or by relative movement of elongated clamps on the ends of a one-piece platform.

2 Claims, 11 Drawing Figures

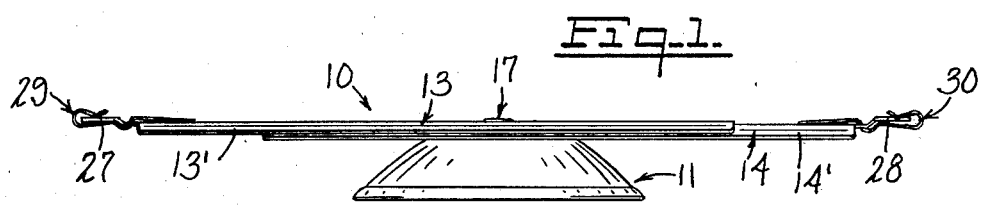
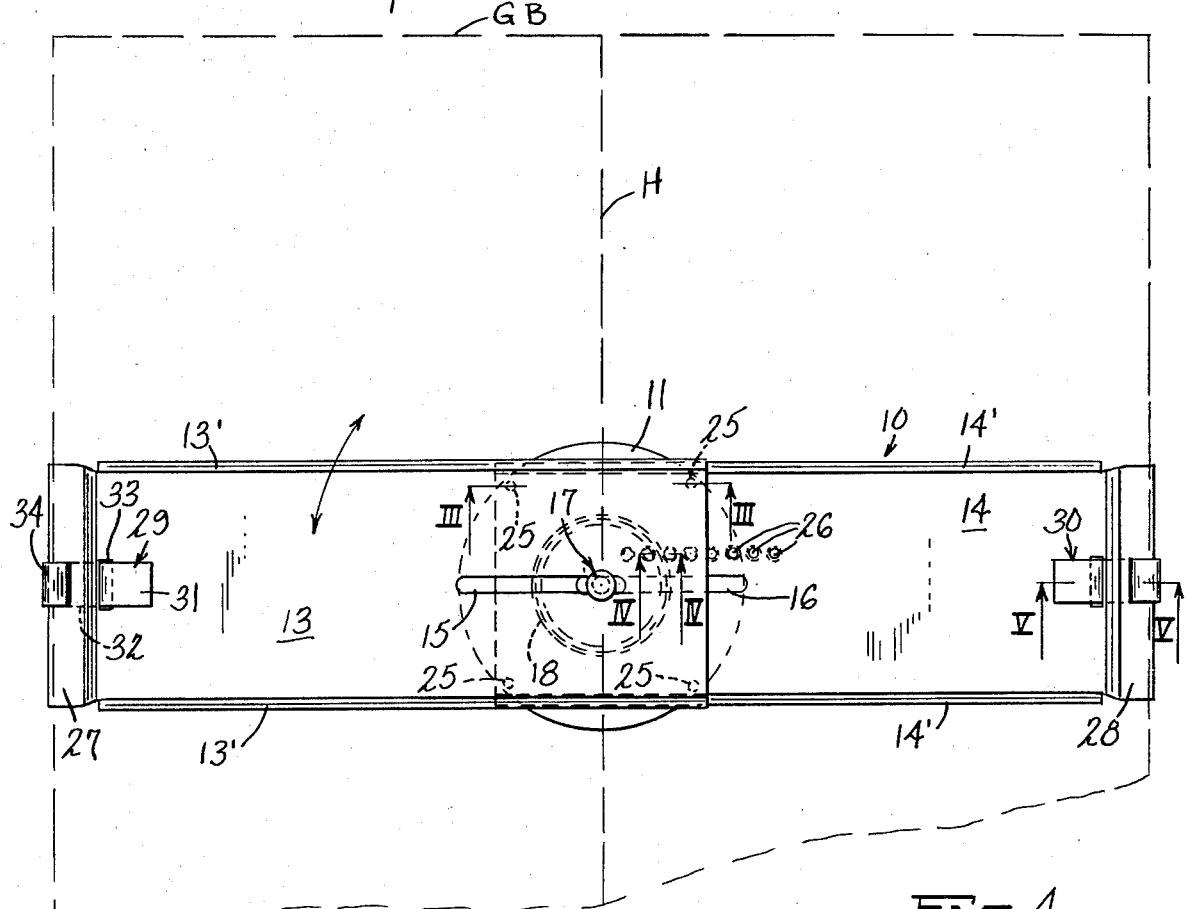
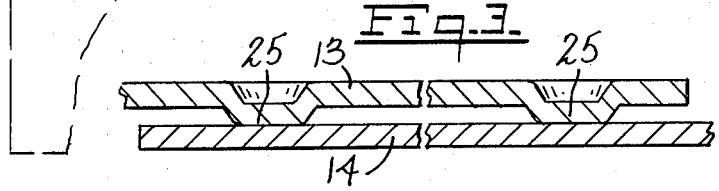
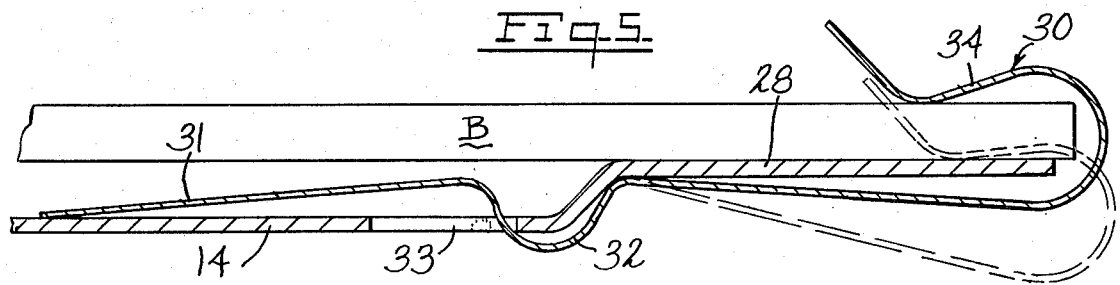

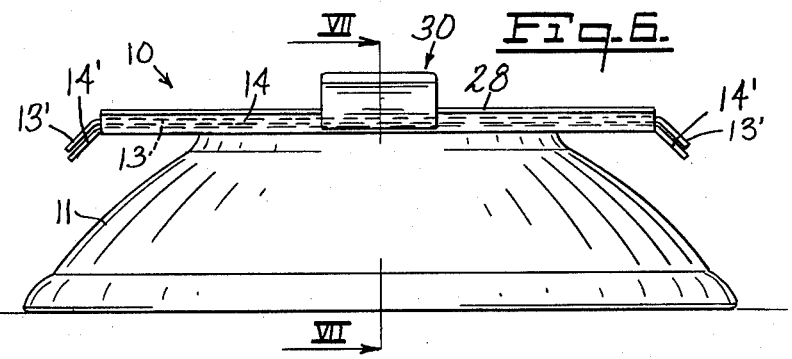
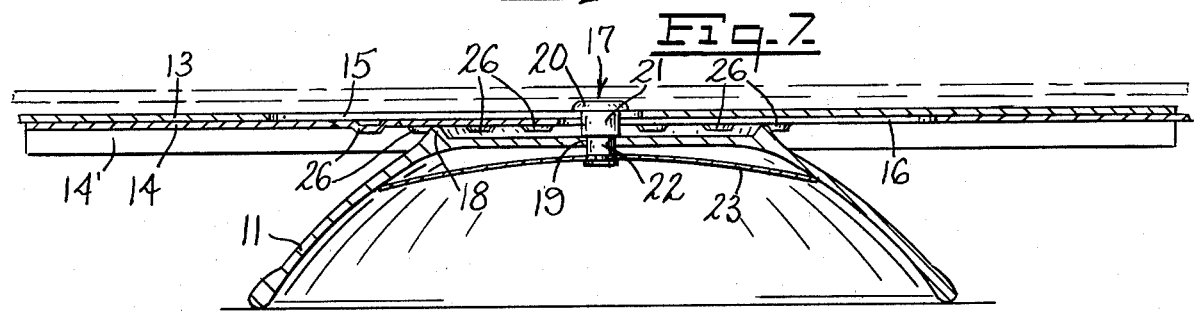
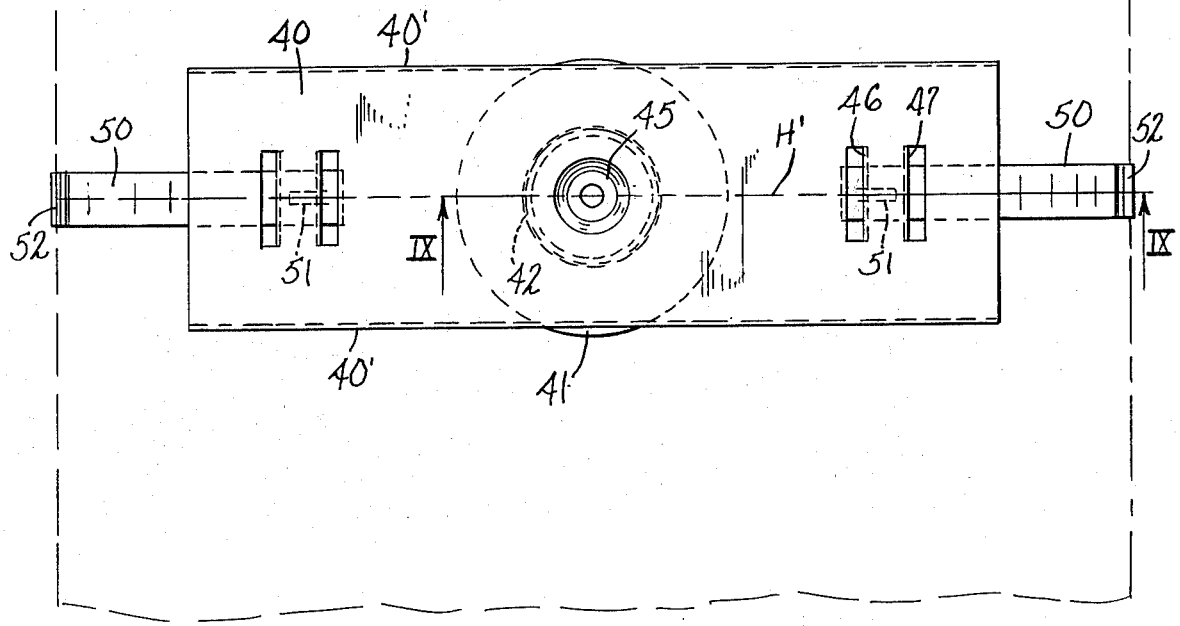

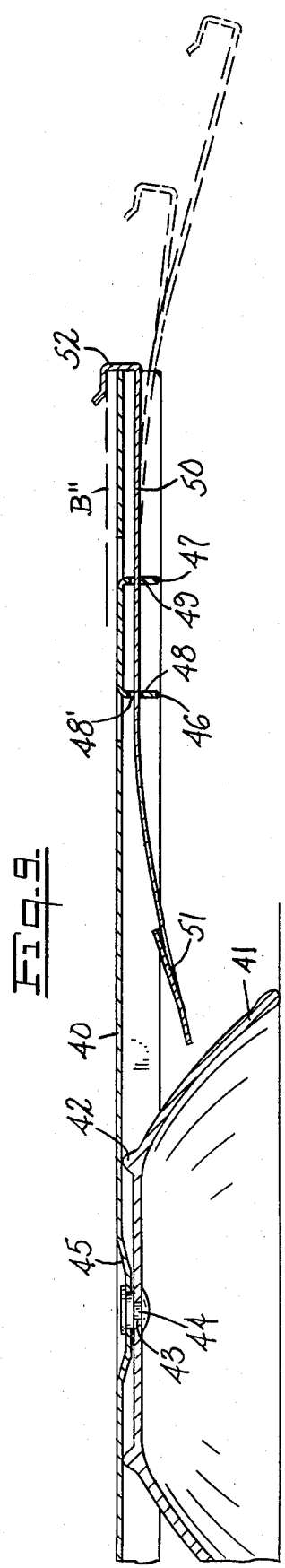
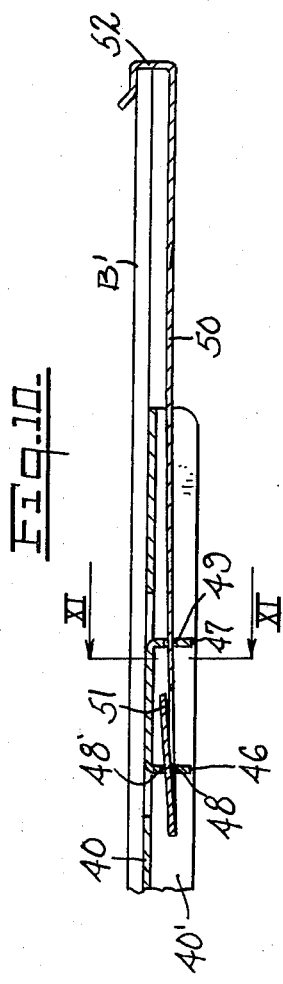
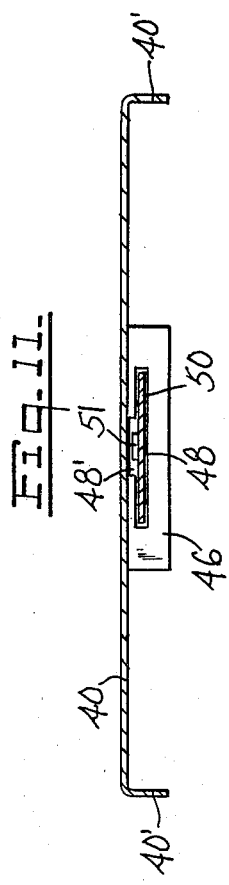

TURNTABLE FOR FOLDING GAME BOARDS

This invention relates to an adjustable turn-table for folding game boards.

Among the popular "board games" wherein playing pieces are placed and/or moved on the surface of a flat, suitably marked, game board, there are many wherein it is distinctly advantageous for each player to be able, at his turn, to view the board from a right-side-up direction. This is particularly true of games wherein the pieces bear legible indicia such as letters or numbers which can be very confusing to a player obliged to evaluate the situation and plan a play or move from an upside-down viewing direction.

Rendering the conventional-type playing board freely and readily turnable, without fuss or danger of displacing the playing pieces will materially add to the pleasure of the game.

It is accordingly an object of the invention to provide a turnable support for a game board, particularly a support which is adjustable to receive boards of various sizes, whether foldable or not.

It is a further object of the invention to provide such a support with means to engage securely a plurality of points or areas around the periphery of the board to ensure stabilization thereof.

It is another object of the invention to provide such a support which acts as a very effective turn-table for the game board while maintaining a low profile, such that the board remains at a convenient height for observation and play.

It is a still further object of the invention to provide certain improvements in the form, construction, and arrangement of the several parts whereby the above named and other objects may effectively be attained.

The invention accordingly comprises an article of manufacture possessing the features, properties, and the relation of elements which will be exemplified in the article hereinafter described, and the scope of the invention will be indicated in the claims.

Practical embodiments of the invention are shown in the accompanying drawings, wherein:

FIG. 1 represents an elevation of a first form of the turn-table;

FIG. 2 represents a top plan view of the turn-table of FIG. 1, extended to receive a square folding game board, shown in broken lines;

FIG. 3 represents a detail vertical section on the line III—III of FIG. 2, looking in the direction of the arrows, parts being broken away:

FIG. 4 represents a detail vertical section on the line IV—IV of FIG. 2, looking in the direction of the arrows;

FIG. 5 represents a detail vertical section on the line V—V of FIG. 2, showing an edge of a game board held by a clamp, the "at-rest" position of which is shown in broken lines;

FIG. 6 represents an elevation of the same turn-table from a direction 90° removed from FIG. 1;

FIG. 7 represents a vertical section on the line VII—VII of FIG. 6;

FIG. 8 represents a top plan view of a modified form of turn-table, with game board indicated in broken lines;

FIG. 9 represents a detail vertical section on the line IX—IX of FIG. 8, but with the clamp engaging a minimum size game board, different adjusted positions of the clamp being shown in broken lines;

FIG. 10 represents a detail vertical section of the right edge of the turn-table of FIG. 9 with clamp extended to engage the edge of a game board of maximum size; and FIG. 11 represents a transverse vertical section on the line XI—XI of FIG. 10.

Referring to the drawings, and particularly to FIGS. 1 to 7, the turn-table comprises a platform portion 10 and a base portion 11, the platform being made up of elongated rectangular plates 13,14 each having marginal flanges 13',14' and being sized to interfit in slidable relation. Adjacent their inboard ends the plates are provided with medially disposed longitudinal slots 15,16 which, when overlapped as shown in FIG. 2, are adapted to permit passage of the pivot pin 17.

The base portion 11 is in the form of an inverted circular dish topped by an annular ridge 18 and provided with a hole 19 in the center to receive the pivot pin 17. The pivot pin is shown (FIG. 7) as having a head 20, a main hub portion 21 and a lower hub portion 22 which last portion fits in the hole 19 and projects downward to engage a leaf spring 23 which serves to bias the pin in a downward direction while permitting limited upward movement, for a purpose to be described.

While the plates 13,14 are basically flat except for their marginal flanges 13',14' the plate 13 is shown as having four small downwardly directed bosses 25, two being located adjacent the inboard corners of the plate and two being spaced some distance from the corners but adjacent respective opposite flanges. The plate 14 is provided with a row of downwardly directed bosses 26 parallel to and spaced a short distance from the slot 16; eight bosses 26 are shown but the number can be varied as desired.

At their outboard ends the plates 13,14 are bent upward and outward to constitute the board supporting surfaces 27,28, each of which is provided with a spring clamp 29,30, the latter being shown in FIG. 5 as having a tail portion 31, a U-shaped intermediate (hinge) portion 32 which passes through a slot 33 in the plate 14 and a hook portion 34 which extends around the outer edge of the surface and is sized to accommodate the edge portion of any game board (B in FIG. 5) to be mounted on the turn-table.

In use, a game board, indicated by the broken line square GB in FIG. 2, is opened out to lie flat each side of its hinge line H and the plates 13,14 are slid to positions such that the clamps 29,30 can engage securely the central portions of opposite edges of the board. This adjustment of the plates is effected by elevating the pivot pin 17 sufficiently to permit one or more bosses 26 to ride over the ridge 18, if adjustment of the plate 14 is necessary, while the plate 13 is moved correspondingly to effect substantially symmetrical elongation or shortening of the platform assembly 10, to fit properly the selected game board. The radial extension of the plate 14 is fixed by the engagement of an adjacent pair of bosses 26 on opposite sides of the ridge 18 (FIG. 4), the plate 13 being retained in its adjusted position by the frictional engagement of bosses 25 against the top surface of the plate 14 (FIGS. 2 and 3) under the influence of spring 23 pulling down on the pivot pin.

In the alternative form shown in FIGS. 8 to 11, the platform portion 40 is in one piece, preferably somewhat wider than the plates 13 and 14 in the first form, and is provided with depending flanges 40' along each side. The base portion 41 is similar to the base portion 11, with an annular ridge 42 and a central hole 43 which receives the pivot pin 44 in the form of a simple rivet, the head of which is countersunk in a depression 45 at the center of the platform.

The under side of the platform is provided with transverse downwardly projecting webs 46,47, one pair spaced from each end of the platform. Each web is traversed by a wide horizontal slot 48,49, the slots 48 in webs 46 being centrally enlarged, as shown at 48' in FIG. 11. The webs 46,47 may conveniently be stamped from the material of the platform 40 and bent as required.

For game board retention the platform 40 is provided with board clamps (at each end) constituted by leaf springs 50 of considerable length, pre-stressed to a downwardly concave curvature as indicated in FIG. 9 by solid lines at the inboard end of the clamp and broken lines showing two extended, unloaded, positions. Each spring has an outwardly directed tongue 51 cut in its inboard end portion and displaced slightly upward to act as a stop when the spring is passed through the slots 48,49 as shown in FIG. 9. At its outer end each spring is formed into a wide square hook 52, adapted to engage securely the edge of a game board B' whether that edge projects beyond the edge of the platform, as in FIG. 10, or coincides with the platform edge as shown at B" in FIG. 9. When the spring clamp is moved to its maximum extension the tongue 51 can pass through the central enlargement 48' of the slot in web 46 but will abut against the inner side of web 47 where the slot 49 has no upward enlargement.

The turn-table of FIGS. 8 to 11 is adapted to support a folding game board GB' in a position such that the hinge H' extends along the center line of the platform, the wide hook portions 52 of the clamps engaging the board firmly for a sufficient distance adjacent the hinge to keep the board flat on the platform.

It will thus be seen that the objects set forth above, among those made apparent from the preceding description, are efficiently attained and, since certain changes may be made in the above article without departing from the spirt and scope of the invention, it is intended that all matter contained in the above description and shown in the accompanying drawings shall be interpreted as illustrative and not in a limiting sense.

What I claim is:

1. A rotatable support for a substantially flat game board comprising a base portion adapted to rest on a table or the like, and being provided with an upwardly directed annular ridge, a platform portion, and a pivot pin mounting the platform portion rotatably on the base portion, the platform portion being constituted by upper and lower relatively slidable marginally flanged flat rectangular plates adapted to support a game board, two board engaging spring clamps mounted at opposite ends of the, respective plates, and means for adjusting the distance between the clamps, each plate being longitudinally slotted and the slots overlapped to provide an aperture to receive the pivot pin, the lower plate being provided with a plurality of downwardly projecting elements adapted to stabilize the adjusted position of said plate in relation to the pivot pin.

2. A rotatable support according to claim 1 wherein the upper plate is provided with a plurality of downwardly projecting elements adapted to stabilize the adjusted position of said upper plate in relation to the lower plate.

* * * * *